United States Patent

Miyagi

(10) Patent No.: US 10,275,735 B2
(45) Date of Patent: Apr. 30, 2019

(54) SALES DATA PROCESSING APPARATUS AND METHOD FOR EXECUTING DATA PROCESSING OF ARTICLE

(71) Applicant: TOSHIBA TEC KABUSHIKI KAISHA, Shinagawa-ku, Tokyo (JP)

(72) Inventor: Daisuke Miyagi, Mishima Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 150 days.

(21) Appl. No.: 15/384,442

(22) Filed: Dec. 20, 2016

(65) Prior Publication Data

US 2017/0185960 A1 Jun. 29, 2017

(30) Foreign Application Priority Data

Dec. 28, 2015 (JP) .................................. 2015-257143

(51) Int. Cl.
G06Q 10/08 (2012.01)
G06Q 20/20 (2012.01)
H04N 1/00 (2006.01)

(52) U.S. Cl.
CPC ..... *G06Q 10/08345* (2013.01); *G06Q 20/201* (2013.01); *G06Q 20/208* (2013.01); *H04N 1/00827* (2013.01)

(58) Field of Classification Search
CPC ........... G06Q 10/08345; G06Q 20/208; G06Q 20/201; H04N 1/00827
See application file for complete search history.

(56) References Cited

U.S. PATENT DOCUMENTS

| 4,326,254 A * | 4/1982 | Uchimura | G06Q 30/04 177/25.15 |
| 2006/0020476 A1* | 1/2006 | Cooper | B07C 1/00 705/335 |
| 2006/0155657 A1* | 7/2006 | Schneeberger | G07B 17/00362 705/404 |
| 2007/0089529 A1* | 4/2007 | Ryan, Jr. | G01B 11/02 73/800 |

(Continued)

FOREIGN PATENT DOCUMENTS

JP 2013-025428 2/2013

*Primary Examiner* — Nathan A Mitchell
(74) *Attorney, Agent, or Firm* — Amin, Turocy & Watson LLP

(57) ABSTRACT

A sales data processing apparatus comprises a control module which switches between a first mode for enabling a reading section, which reads a three-dimensional shape of an article and a two-dimensional image of the article, to read the three-dimensional shape of the article and a second mode for reading the two-dimensional image of the article; a calculation module which calculates a delivery charge of the article based on the three-dimensional shape of the article read in the first mode and a list in which the charge is determined for each volume of the article to be delivered; a registration module which registers an amount of the article contained in the two-dimensional image based on the two-dimensional image read in the second mode; and a first display control module which displays the delivery charge calculated by the calculation module or the amount registered by the registration module.

6 Claims, 6 Drawing Sheets

(56) References Cited

U.S. PATENT DOCUMENTS

| | | | |
|---|---|---|---|
| 2008/0017716 A1* | 1/2008 | Knowles | G06K 7/10693 235/462.42 |
| 2010/0153309 A1* | 6/2010 | Asano | G06F 3/03545 705/407 |
| 2010/0208039 A1* | 8/2010 | Stettner | G01B 11/00 348/49 |
| 2011/0188741 A1* | 8/2011 | Sones | G06K 9/00 382/154 |
| 2012/0123970 A1* | 5/2012 | Lorello | G06Q 30/02 705/410 |
| 2013/0070085 A1* | 3/2013 | Boulanger | G01B 11/02 348/135 |
| 2014/0104413 A1* | 4/2014 | McCloskey | G06Q 10/083 348/135 |
| 2014/0279657 A1* | 9/2014 | Stowe | G06Q 10/08345 705/335 |
| 2015/0187091 A1* | 7/2015 | Hata | G01B 11/02 382/101 |

* cited by examiner

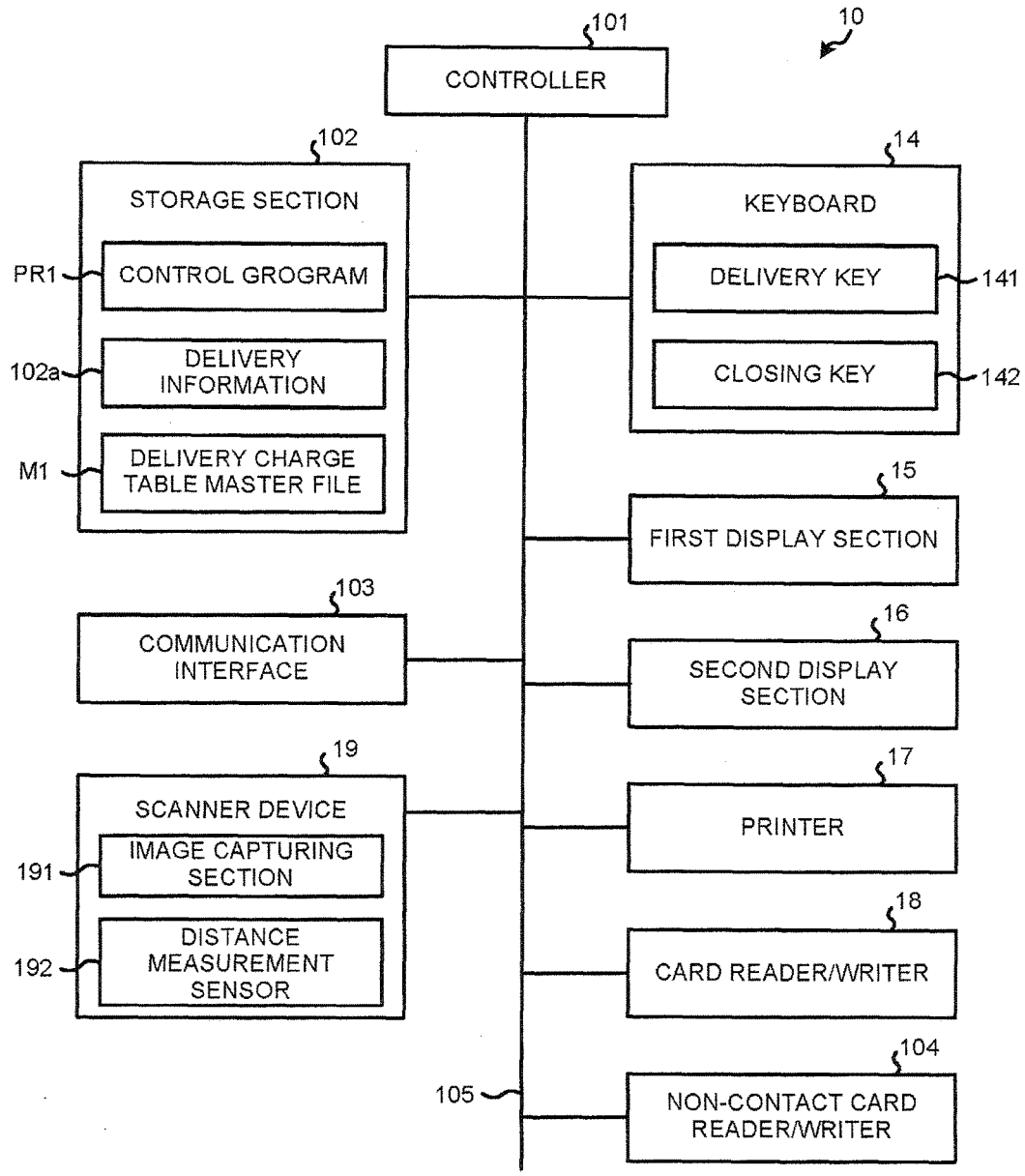

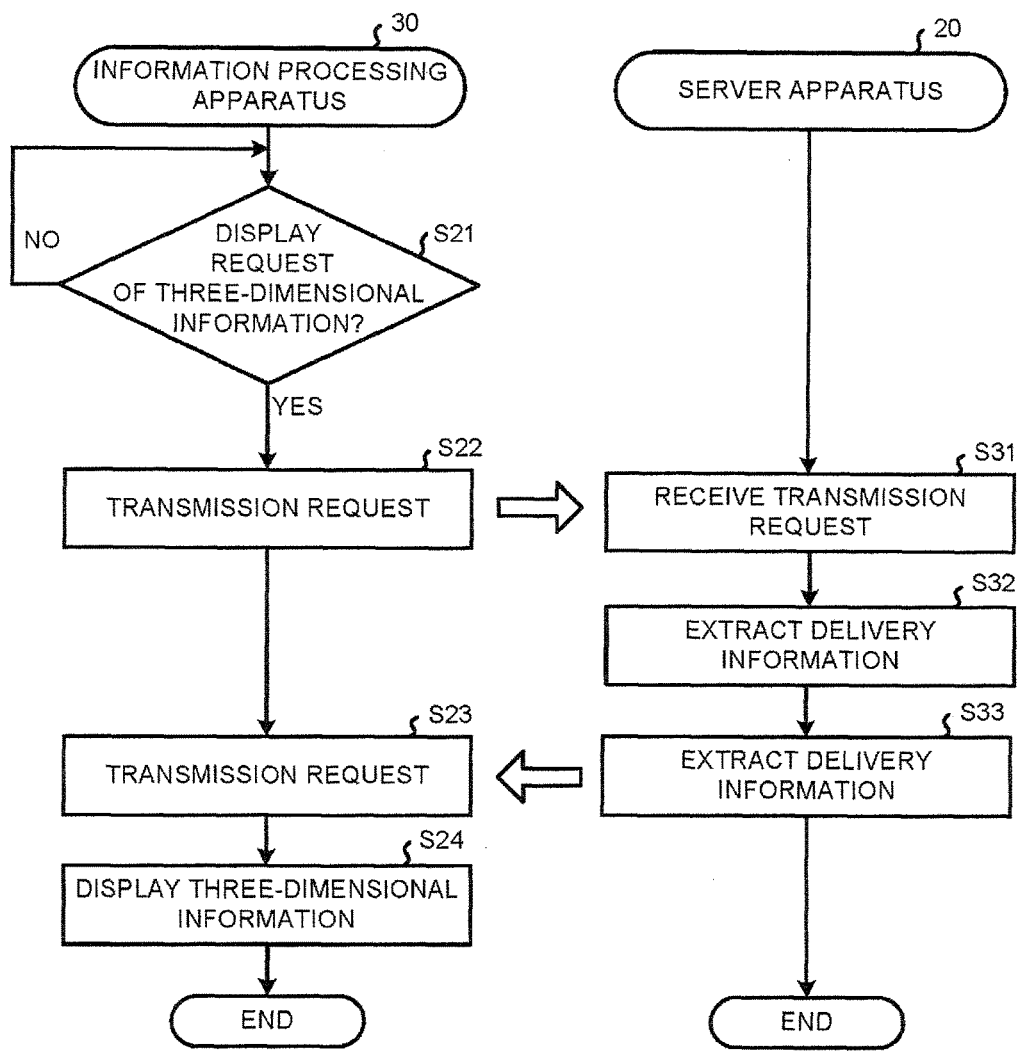

SALES DATA PROCESSING APPARATUS AND METHOD FOR EXECUTING DATA PROCESSING OF ARTICLE

This application is based upon and claims the benefit of priority from Japanese Patent Application No. 2015-257143, filed Dec. 28, 2015, the entire contents of which are incorporated herein by reference.

FIELD

Embodiments described herein relate generally to a sales data processing apparatus and a method for automatically measuring capacity of an article.

BACKGROUND

Conventionally, in a store such as a convenience store, a reception job of an article, e.g., a parcel sent through a so-called home delivery service is carried out. A POS (Point Of Sales) terminal executes a sales data processing for a service relating to the delivery.

In a case of executing the sales data processing relating to the delivery, a store clerk uses a tape measure to measure a volume (Width×Height×Depth) of the parcel received. Then, the store clerk registers the volume and a delivery destination of the measured parcel in the POS terminal. The POS terminal calculates a delivery charge based on the registered volume and delivery destination of the parcel to be delivered.

However, the store clerk has to manually measure the volume of the parcel to be delivered at the time of the reception job of the parcel delivery such as the home delivery service, which is troublesome.

DESCRIPTION OF THE DRAWINGS

FIG. 3 is a block diagram illustrating an example of the hardware arrangement of the POS terminal;

FIG. 4 is a view illustrating an example of the data structure of delivery information;

FIG. 9 is a flowchart diagram illustrating an example of a three-dimensional information display processing.

DETAILED DESCRIPTION

In accordance with an embodiment, a sales data processing apparatus comprises a control module, a calculation module, a registration module and a first display control module. The control module switches a mode between a first mode for enabling a reading section, which reads a three-dimensional shape of an article and a two-dimensional image of the article, to read the three-dimensional shape of the article and a second mode for enabling the reading section to read the two-dimensional image of the article. The calculation module calculates a delivery charge of the article based on the three-dimensional shape of the article read by the reading section in the first mode and a list in which the delivery charge is determined for each volume of an article to be delivered. The registration module registers an amount of the article contained in the two-dimensional image based on the two-dimensional image read by the reading section in the second mode. The first display control module displays the delivery charge calculated by the calculation module or the amount registered by the registration module.

Hereinafter, with reference to the accompanying drawings, an embodiment of a sales data processing apparatus and a method for executing a data processing of an article is described in detail. Furthermore, the embodiment described below is an example of the sales data processing apparatus and a method for executing a data processing of an article, and not intends to limit the arrangement and specification thereof. The present embodiment is an example applicable to a POS (Point Of Sales) terminal introduced in a store such as a convenience store to carry out registration and settlement of a commodity relating to one transaction.

Figure 1:
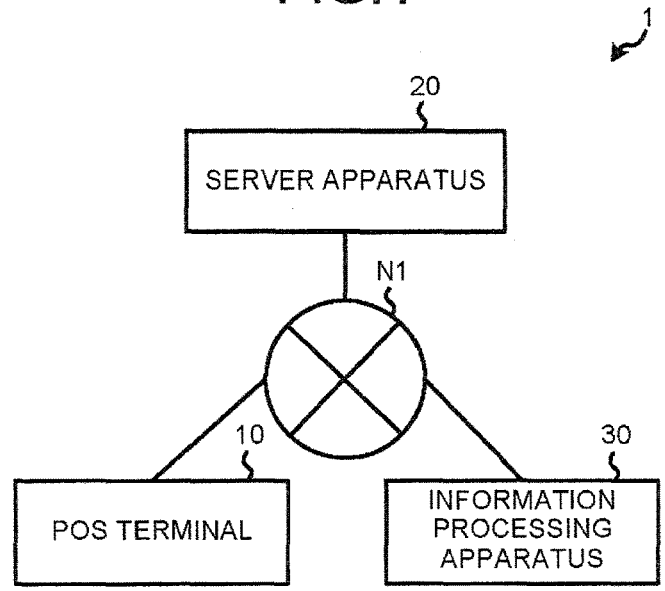
FIG. 1 is a view illustrating an example of the arrangement of a home delivery system according to an embodiment.

FIG. 1 is a view illustrating an example of the arrangement of a home delivery system 1 according to the present embodiment. The home delivery system 1 comprises a POS terminal 10, a server apparatus 20 and an information processing apparatus 30. Then, in the home delivery system 1, the POS terminal 10, the server apparatus 20 and the information processing apparatus 30 are connected with one another through a network N1. The network N1 is, for example, a LAN (Local Area Network) or the like.

The POS terminal 10 executes a sales data processing relating to a delivery such as a home delivery service. More particularly, the POS terminal 10 executes a registration of volume (Width×Height×Depth) of an article, e.g., a parcel, to be delivered, a registration of a delivery destination of the article and a calculation of a delivery charge. The POS terminal 10 registers information relating to the delivery in the server apparatus 20 after the sales data processing relating to the delivery is completed.

The server apparatus 20 is a personal computer which stores the information relating to the delivery. The server apparatus 20 stores the information relating to the delivery transmitted from the POS terminal 10.

The information processing apparatus 30 is a personal computer which is used by a person in charge who delivers an article. The information processing apparatus 30 displays the information relating to the delivery stored in the server apparatus 20. Furthermore, the information processing apparatus 30 is not limited to the personal computer, but may also be a portable terminal such as a smart-phone. The home delivery system 1 shown in FIG. 1 includes one POS terminal 10, one server apparatus 20 and one information processing apparatus 30; however, the home delivery system 1 may include a plurality of the POS terminals 10, a plurality of the server apparatuses 20 and a plurality of the information processing apparatuses 30.

Figure 2:
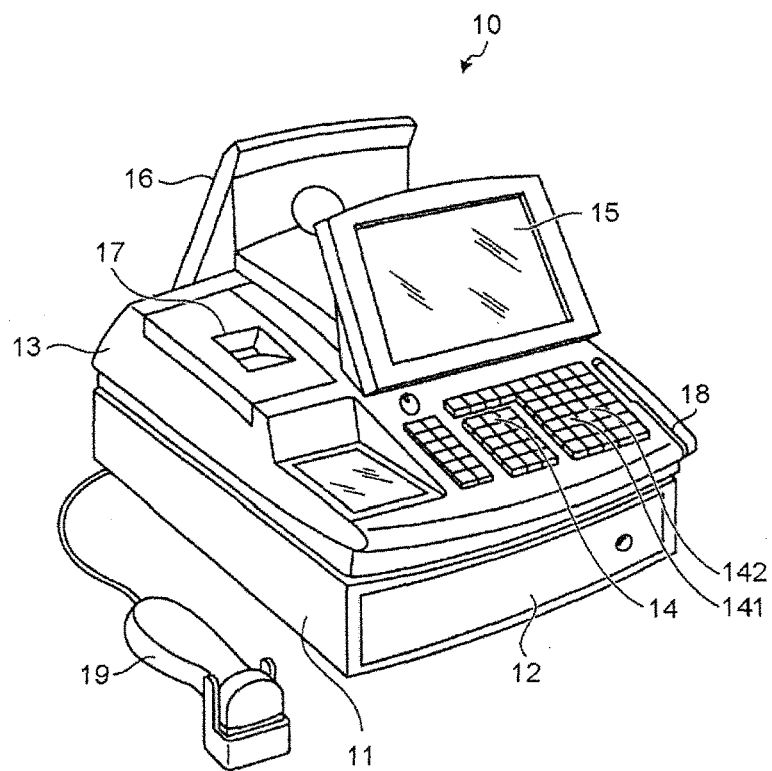
FIG. 2 is an external perspective view illustrating an example of the appearance of a POS terminal.

FIG. 2 is an external perspective view illustrating an example of the appearance of the POS terminal 10. The POS terminal 10 acts as a sales data processing apparatus for executing the sales data processing. The POS terminal 10 is placed on a drawer 11, and can control an opening operation of a drawer case 12 of the drawer 11. The drawer 11 houses cash received from a customer and cash to be used as change and the like. The POS terminal 10 may comprise an automatic change dispensing machine together with the drawer 11 or instead of the drawer 11. A main body housing 13 of the POS terminal 10 is provided with a keyboard 14 and a first display section 15 at the right side of the upper surface.

The keyboard 14 is provided with various keys to operate the POS terminal 10. For example, the keyboard 14 includes a delivery key 141 and a closing key 142. The delivery key 141 is used to set the execution of the sales data processing relating to the delivery. The closing key 142 is used to declare the end of the sales data processing relating to one transaction after the charge is received.

The first display section 15 is a touch-panel type liquid crystal display device (LCD) in which the touch panel is overlaid on the display surface thereof. The first display section 15 displays, for example, a screen mainly seen by an operator such as a store clerk of the store. Furthermore, the first display section 15 is not limited to the liquid crystal display device, but may also be an organic EL (Electro-Luminescence) display device. A second display section 16 is arranged at the rear side of the upper surface of the main body housing 13. The second display section 16 is a touch-panel type liquid crystal display device (LCD) on the display surface of which a touch panel is overlaid. The second display section 16 displays, for example, a screen mainly seen by a customer who purchases a commodity. Furthermore, the second display section 16 is not limited to the liquid crystal display device, and may also be an organic EL display device.

A printer 17 is arranged at the left side of the upper surface of the main body housing 13 of the POS terminal 10. The printer 17 prints a receipt and a journal in unit of transaction to issue the receipt and the journal.

A card reader/writer 18 is arranged in a groove at the right side surface of the main body housing 13 of the POS terminal 10. The card reader/writer 18 scans a card to read card information from the card.

The POS terminal 10 is equipped with a handy-type scanner device 19. The scanner device 19 reads the appearance of the article to be delivered and a code symbol attached to the commodity. The scanner device 19 includes an image capturing section 191 (refer to FIG. 3) and a distance measurement sensor 192 (refer to FIG. 3).

The image capturing section 191 is a color CCD sensor or a color CMOS sensor. The image capturing section 191 reads a two-dimensional image of one frame corresponding to an image capturing range. The two-dimensional image may be a monochrome image or a color image. In the case of the color image, an RGB (Red, Green and Blue) value is associated with a luminance value for each pixel.

The distance measurement sensor 192 reads the three-dimensional shape of the article to generate distance information. The distance information indicates a distance from the distance measurement sensor 192 to an object article. In other words, the distance information includes information indicating length, width and height of the object article and information indicating unevenness of the surface of the object article. More particularly, the distance measurement sensor 192 irradiates the object article with the laser light to measure a time spent on reciprocating of reflected laser light and the direction of the irradiated laser light to extract a three-dimensional coordinate data. The distance measurement sensor 192 repeats the extraction of the three-dimensional coordinate data of the object article for a plurality of times to generate the distance information indicating the distance to the object article.

The scanner device 19 switches reading modes relating to a reading method of the article according to control of a mode controller 1002 described later. The reading modes include a three-dimensional scanner mode and a commodity code scanner mode. The three-dimensional scanner mode, a first mode, is a mode of enabling the scanner device 19 to read a three-dimensional shape of the object article. The commodity code scanner mode, a second mode, is a mode of enabling the scanner device 19 to read the two-dimensional image of the object article. On condition that the reading mode is the commodity code scanner mode, a commodity code reading section 1003 (refer to FIG. 7) described later extracts the commodity code from the two-dimensional image.

Next, the hardware arrangement of each apparatus of the home delivery system 1 is described.

FIG. 3 is a block diagram illustrating an example of the hardware arrangement of the POS terminal 10. The POS terminal 10 comprises a controller 101, a storage section 102, a communication interface 103, a scanner device 19, the keyboard 14, the first display section 15, the second display section 16, the printer 17, the card reader/writer 18, and a non-contact card reader/writer 104. The controller 101, the storage section 102, the communication interface 103, the scanner device 19, the keyboard 14, the first display section 15, the second display section 16, the printer 17, the card reader/writer 18 and the non-contact card reader/writer 104 are connected with each other via a system bus line 105.

The controller 101 controls the whole operation of the POS terminal 10 to realize various functions of the POS terminal 10. The controller 101 includes a CPU (Central Processing Unit), a ROM (Read Only Memory), and a RAM (Random Access memory). The CPU collectively controls the operation of the POS terminal 10. The ROM is a storage medium that stores various programs and data. The RAM temporarily stores various programs or rewrites various data. Then, the CPU uses the RAM as a working area (work area) and executes a program stored in the ROM or the storage section 102.

The storage section 102 is a storage device such as an HDD (Hard Disk Drive) or an SSD (Solid State Drive). The storage section 102 stores a control program PR1, a delivery charge table master file M1 and delivery information 102a.

The control program PR1 is an operating system or a program for exerting the functions of the POS terminal 10. Then, the control program PR1 includes programs for exerting a characteristic function according to the present embodiment.

The delivery charge table master file M1 is information indicating a list of the delivery charges relating to the delivery. In the delivery charge table master file M1, the delivery charge is determined for each volume of the article to be delivered. For example, in the delivery charge table master file M1, the delivery charge is determined for each combination of the length, the width and the height of the article. Furthermore, the delivery charge table master file M1 may contain the delivery destination, weight, necessity of refrigeration as conditions for determining the delivery charge in addition to the volume of the article. Furthermore, in the delivery charge table master file M1, the delivery charge is not limited to be determined for each combination of the length, the width and the height of the article, but may be determined for each value of the volume of the article.

The delivery information 102a is the information relating to the delivery input to the POS terminal 10. FIG. 4 is a view illustrating an example of the data structure of the delivery information 102a. The delivery information 102a includes a voucher (sales slip) number, three-dimensional information, a destination and the delivery charge. The voucher number is capable of identifying a voucher relating to the delivery. In other words, the voucher number is capable of identifying the delivery information 102a. The three-dimensional information indicates the three-dimensional shape of the article to be delivered. The destination indicates the delivery destination. In other words, the destination is information such as an address indicating the delivery destination. Furthermore, the destination may be a voucher on which the address indicating the delivery destination is recorded. The delivery charge indicates the charge of the delivery calculated based on the delivery charge table master file M1.

The communication interface 103 is an interface for connecting with the network N1.

The non-contact card reader/writer 104 executes reading and writing of the information from/to an IC tag of a non-contact IC card through a short-range wireless communication such as an NFC (Near Field Communication).

Figure 5:
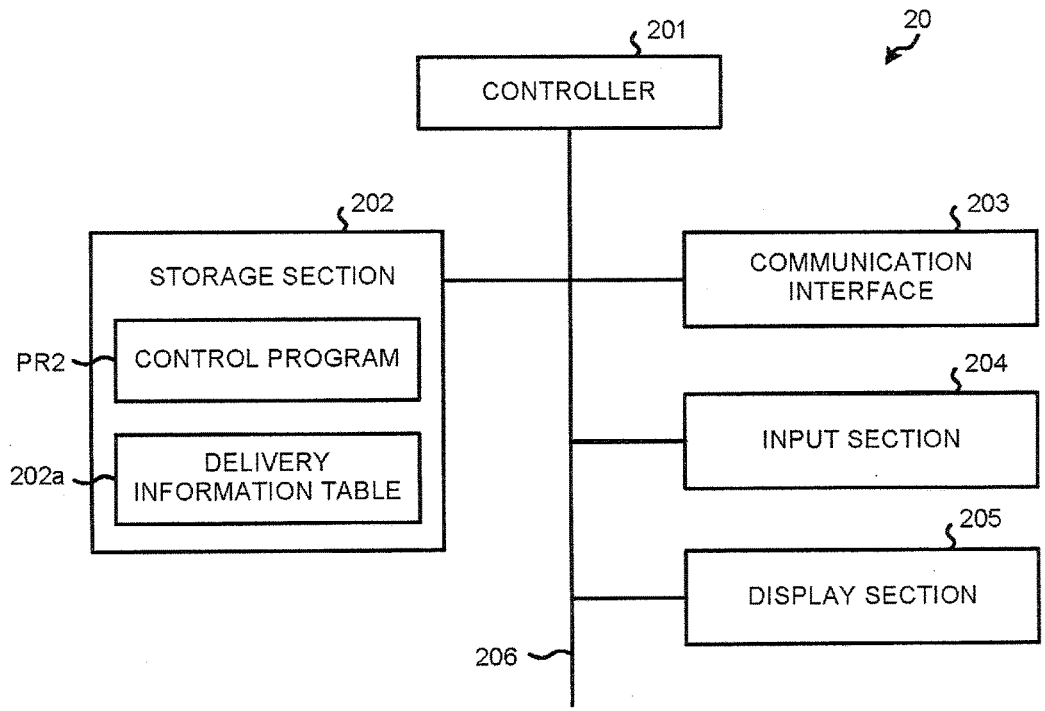
FIG. 5 is a block diagram illustrating an example of hardware arrangement of a server apparatus.

FIG. 5 is a block diagram illustrating an example of the hardware arrangement of the server apparatus 20. The server apparatus 20 comprises a controller 201, a storage section 202, a communication interface 203, an input section 204 and a display section 205. The controller 201, the storage section 202, the communication interface 203, the input section 204 and the display section 205 are connected with each other via a system bus line 206.

The controller 201 controls the whole operation of the server apparatus 20 to realize various functions of the server apparatus 20. The controller 201 includes a CPU, a ROM and a RAM. The CPU collectively controls the operation of the server apparatus 20. The ROM is a storage medium that stores various programs and data. The RAM temporarily stores various programs or rewrites various data. The CPU executes a program stored in the ROM or the storage section 202, using the RAM as a working area (work area).

The storage section 202 is a storage device such as an HDD or an SSD. The storage section 202 stores a control program PR2 and a delivery information table 202a.

The control program PR2 is an operating system or a program for exerting the functions of the server apparatus 20. The control program PR2 includes programs for exerting a characteristic function according to the present embodiment.

The delivery information table 202a is a table for storing the delivery information 102a transmitted from the POS terminal 10.

The communication interface 203 is an interface for connecting with the network N1.

The input section 204 is an input device such as a keyboard, a mouse and the like. The input section 204 receives an operation on the server apparatus 20.

The display section 205 is, for example, a liquid crystal display device (LCD). The display section 205 is not limited to the liquid crystal display device, but may also be an organic EL display device.

Figure 6:
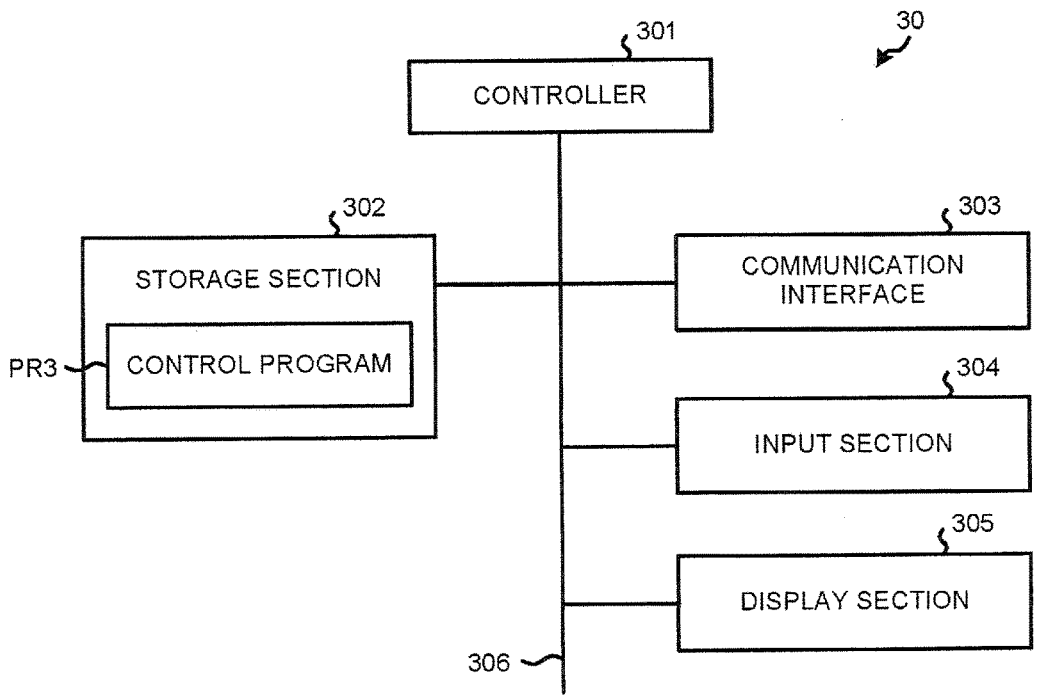
FIG. 6 is a block diagram illustrating an example of the hardware arrangement of an information processing apparatus.

FIG. 6 is a block diagram illustrating an example of the hardware arrangement of the information processing apparatus 30. The information processing apparatus 30 comprises a controller 301, a storage section 302, a communication interface 303, an input section 304 and a display section 305. The controller 301, the storage section 302, the communication interface 303, the input section 304 and the display section 305 are connected with each other via a system bus line 306.

The controller 301 controls the whole operation of the information processing apparatus 30 to realize various functions of the information processing apparatus 30. The controller 301 includes a CPU, a ROM and a RAM. The CPU collectively controls the operation of the information processing apparatus 30. The ROM is a storage medium that stores various programs and data. The RAM temporarily stores various programs or rewrites various data. Then, the CPU executes a program stored in the ROM or the storage section 302, using the RAM as a working area (work area).

The storage section 302 is a storage device such as an HDD or an SSD. The storage section 302 stores a control program PR3.

The control program PR3 is an operating system or a program for exerting the functions of the information processing apparatus 30. Then, the control program PR3 includes programs for exerting a characteristic function according to the present embodiment.

The communication interface 303 is an interface for connecting with the network N1.

The input section 304 is an input device such as a keyboard, a mouse and the like. The input section 304 receives an operation on the information processing apparatus 30.

The display section 305 is, for example, a liquid crystal display device (LCD). The display section 305 is not limited to the liquid crystal display device, but may also be an organic EL display device.

Figure 7:
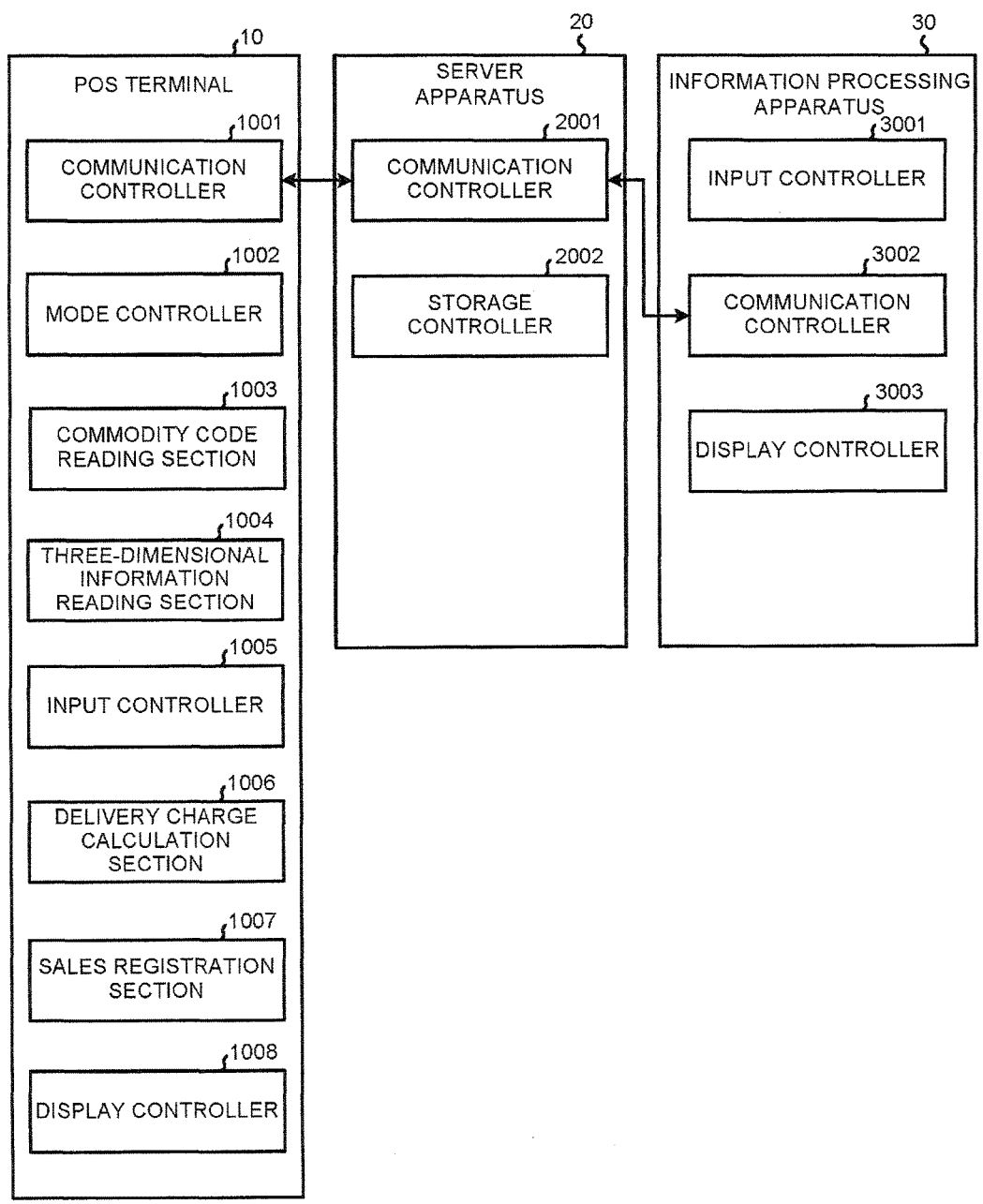
FIG. 7 is a block diagram illustrating characteristic functional components of each apparatus of the home delivery system.

Next, the characteristic function of each apparatus of the home delivery system 1 is described. FIG. 7 is a block diagram illustrating characteristic functional components of each apparatus of the home delivery system 1.

First, the characteristic function of the POS terminal 10 is described.

The CPU of the controller 101 copies or decompresses the control program PR1 in the storage section 102 on the RAM and operates according to the control program PR1 to generate each functional section shown in FIG. 7 on the RAM. In particular, the controller 101 includes, as functional sections, a communication controller 1001, a mode controller 1002, a commodity code reading section 1003, a three-dimensional information reading section 1004, an input controller 1005, a delivery charge calculation section 1006, a sales registration section 1007 and a display controller 1008.

The communication controller 1001 controls the communication interface 103 to communicate with the server apparatus 20 connected to the network N1. The communication controller 1001 transmits the delivery information 102a after the sales data processing relating to the delivery is terminated, for example. The server apparatus 20 stores the received delivery information 102a in the delivery information table 202a. In other words, the communication controller 1001 acting as a storage control module stores the delivery information 102a in the delivery information table 202a.

The mode controller 1002 controls the switching of the reading modes responding to the reading method by the scanner device 19. The mode controller 1002 acting as a control module controls the switching between the three-dimensional scanner mode and the commodity code scanner mode. The mode controller 1002 changes the reading mode to the three-dimensional scanner mode on condition that the delivery key 141 is pressed. The mode controller 1002 changes the reading mode to the commodity code scanner mode on condition that the closing key 142 is pressed to declare that the sales data processing relating to the delivery is completed after the delivery charge is received. In other words, on condition that an operation for terminating the processing relating to the three-dimensional scanner mode is received, the mode controller 1002 changes the reading mode to the commodity code scanner mode. The delivery key 141 which is a switching key of the reading modes relating to the reading method by the scanner device 19 is not limited to be arranged on the keyboard 14, but may also be arranged in the scanner device 19. Alternatively, the delivery key 141 may be a soft key displayed on the first display section 15.

The commodity code reading section 1003 controls the processing in the commodity code scanner mode. The commodity code reading section 1003 controls the image capturing section 191 of the scanner device 19 to capture the two-dimensional image on condition that the reading mode is set to the commodity code scanner mode. The commodity code reading section 1003 detects a code symbol attached to the commodity from the two-dimensional image captured by the image capturing section 191. The commodity code reading section 1003 extracts the commodity code from the code symbol after the code symbol is detected. The commodity code can be used to identify the commodity.

The three-dimensional information reading section 1004 acting as a generation module controls the processing in the three-dimensional scanner mode. The three-dimensional information reading section 1004 controls the scanner device 19 to capture the two-dimensional image generated by the image capturing section 191 and the distance information generated by the distance measurement sensor 192. The three-dimensional information reading section 1004 synthesizes the two-dimensional image and the distance information to generate the three-dimensional information which is capable of reconstituting the three-dimensional shape of the object article. In other words, the three-dimensional information reading section 1004 generates the three-dimensional information that can display the three-dimensional shape of the object article on the first display section 15, the second display section 16, the display section 205, or the display section 305. The three-dimensional information reading section 1004 registers the generated three-dimensional information in the delivery information 102a. The foregoing generation method of the three-dimensional information is an example, and the three-dimensional information of the object article may be generated with other method.

The input controller 1005 controls the keyboard 14 to receive the voucher number of the voucher attached to the object article to be delivered and the destination. The input controller 1005 registers the voucher number and the destination input to the delivery information 102a. Furthermore, the input controller 1005 may receive the input of the destination from an input device other than the keyboard 14 when inputting the voucher number and the destination. Alternatively, the input controller 1005 may receive the input of the voucher number and the destination from the voucher image in which the delivery destination is indicated.

The delivery charge calculation section 1006 calculates the delivery charge. The delivery charge calculation section 1006 acting as a calculation module calculates the delivery charge of the article indicated by the three-dimensional information based on the three-dimensional information of the delivery information 102a and the delivery charge table master file M1. In particular, the delivery charge calculation section 1006 determines which one in the delivery charge table master file M1 the volume of the article indicated by the three-dimensional information of the delivery information 102a corresponds to. The delivery charge calculation section 1006 extracts the delivery charge associated with the volume corresponding to the volume of the article indicated by the three-dimensional information from the delivery charge table master file M1. The delivery charge calculation section 1006 sets the delivery charge extracted from the delivery charge table master file M1 as the delivery charge of the article indicated by the three-dimensional information. The delivery charge calculation section 1006 may calculate the delivery charge in consideration with delivery conditions such as the delivery destination, the shape of the article, the weight, the necessity of refrigeration and the like. The delivery charge calculation section 1006 can directly calculate the volume of the article from the three-dimensional information of the delivery information 102a on condition that the delivery charge is determined for each value of the volume of the article in the delivery charge table master file M1. In this way, the delivery charge calculation section 1006 can accurately calculate the delivery charge easily even if the article is, for example, irregular shaped article that is not in a box such as a golf bag and a cylindrical or conical shaped article other than the rectangular shaped article.

The sales registration section 1007 registers sales object such as a commodity and a service and the charge of the sales object as the sales information. The sales information indicates the sales of the object. The sales registration section 1007 registers the service relating to the delivery and the delivery charge calculated by the delivery charge calculation section 1006 as the sales information in a case in which the mode controller 1002 sets the reading mode to the three-dimensional scanner mode. The sales registration section 1007 registers the commodity identified by the commodity code extracted by the commodity code reading section 1003 and the sales charge or amount of the commodity as the sales information in a case in which the mode controller 1002 sets the reading mode to the commodity code scanner mode.

The display controller 1008 controls the first display section 15 or the second display section 16 to display various screens. For example, the display controller 1008 acting as a second display control module displays a guidance screen (not shown) showing a use method of the scanner device 19 in the sales data processing relating to the delivery. In particular, the display controller 1008 displays the guidance screen showing the reading method of the three-dimensional shape of the object article in the three-dimensional scanner mode. In this way, the store clerk can smoothly operate the scanner device 19. The display controller 1008 acting as a first display control module displays a screen showing the delivery charge calculated by the delivery charge calculation section 1006. In this way, the store clerk can ask for payment of the displayed delivery charge to the customer.

Next, the characteristic function of the server apparatus 20 is described.

The CPU of the controller 201 copies or decompresses the control program PR2 in the storage section 202 on the RAM and operates according to the control program PR2 to generate each functional section shown in FIG. 7 on the RAM. In particular, the controller 201 includes, as functional sections, a communication controller 2001 and a storage controller 2002.

The communication controller 2001 controls the communication interface 203 to communicate with the POS terminal 10 connected with the network N1. The communication controller 2001 receives the delivery information 102a from the POS terminal 10. The communication controller 2001 controls the communication interface 203 to communicate with the information processing apparatus 30 connected to the network N1. The communication controller 2001 receives a transmission request of the delivery information 102a from the information processing apparatus 30. The transmission request contains the voucher number of the corresponding delivery information 102a. The communication controller 2001 transmits the three-dimensional information contained in the delivery information 102a corresponding to the voucher number included in the transmission request.

The storage controller 2002 stores the delivery information 102a in the delivery information table 202a after the communication controller 2001 receives the delivery information 102a. The storage controller 2002 extracts the delivery information 102a corresponding to the voucher number included in the transmission request after the communication controller 2001 receives the transmission request.

Next, the characteristic function of the information processing apparatus 30 is described.

The CPU of the controller 301 copies or decompresses the control program PR3 in the storage section 302 on the RAM and operates according to the control program PR3 to generate each functional section shown in FIG. 7 on the RAM. In particular, the controller 301 includes, as functional sections, an input controller 3001, a communication controller 3002 and the display controller 3003.

The input controller 3001 controls the input section 304 to receive various operations. For example, the input controller 3001 receives an operation for displaying the delivery information 102a. In particular, the input controller 3001 receives the voucher number of the delivery information 102a to be displayed and a display request.

The communication controller 3002 controls the communication interface 303 to communicate with the server apparatus 20 connected to the network N1. The communication controller 3002 transmits the transmission request for requesting the transmission of the delivery information 102a to the server apparatus 20 after the input controller 3001 receives the display request of the delivery information 102a. The transmission request contains the voucher number relating to the display request. The communication controller 3002 receives the delivery information 102a corresponding to the voucher number from the server apparatus 20.

The display controller 3003 controls the display section 305 to display various screens. The display controller 3003 displays the three-dimensional information of the delivery information 102a received by the communication controller 3002. More particularly, the display controller 3003 converts the three-dimensional information to the three-dimensional image to display the three-dimensional image on the display section 305. In this way, the display controller 3003 can display the three-dimensional image of the delivery article. In other words, the delivery person or a recipient of the article can check whether or not the delivered article is damaged before and after the delivery.

Figure 8:
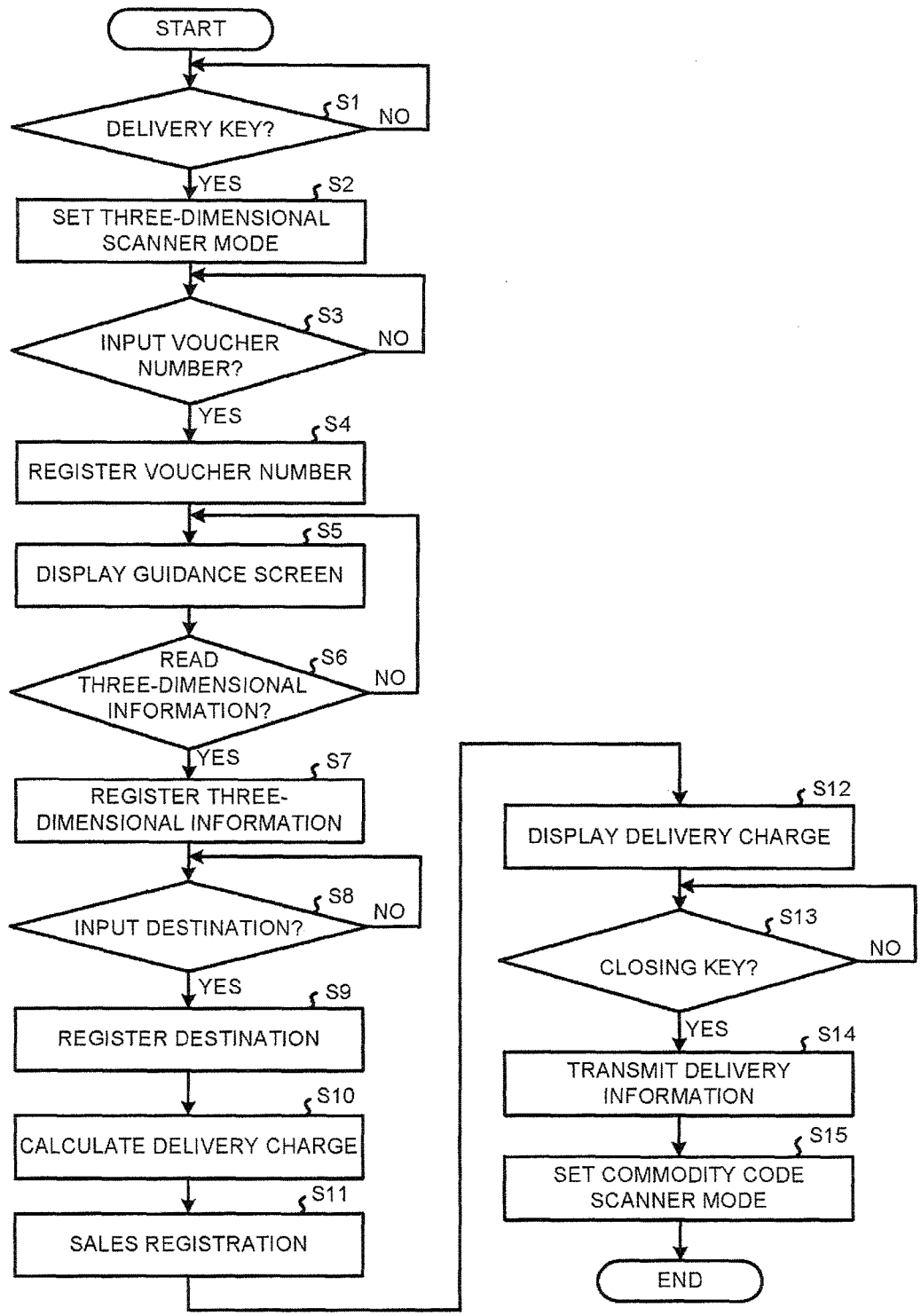
FIG. 8 is a flowchart diagram illustrating an example of a sales data processing relating to the delivery.

Next, the sales data processing relating to the delivery executed by the POS terminal 10 is described. FIG. 8 is a flowchart illustrating the sales data processing relating to the delivery executed by the POS terminal 10 according to the present embodiment.

First, the mode controller 1002 of the POS terminal 10 determines whether or not the delivery key 141 is pressed (ACT S1). If the delivery key 141 is not pressed (No in ACT S1), the mode controller 1002 of the POS terminal 10 stands by until the delivery key 141 is pressed.

On the other hand, if the delivery key 141 is pressed (Yes in ACT S1), the mode controller 1002 of the POS terminal 10 sets the reading mode to the three-dimensional scanner mode (ACT S2).

Next, the input controller 1005 of the POS terminal 10 determines whether or not the voucher number of the voucher attached to the article to be delivered is input (ACT S3). If the voucher number is not input (No in ACT S3), the input controller 1005 of the POS terminal 10 stands by until the voucher number is input.

On the other hand, if the voucher number is input (Yes in ACT S3), the input controller 1005 of the POS terminal 10 registers the voucher number in the delivery information 102a (ACT S4).

Next, the display controller 1008 of the POS terminal 10 displays the guidance screen showing the use method of the scanner device 19 (ACT S5).

The three-dimensional information reading section 1004 of the POS terminal 10 determines whether or not the reading of the three-dimensional information of the article to be delivered is terminated (ACT S6). If the reading of the three-dimensional information of the article to be delivered is not terminated (No in ACT S6), the three-dimensional information reading section 1004 of the POS terminal 10 proceeds to the processing in ACT S5 to continue the reading of the three-dimensional information.

On the other hand, If the reading of the three-dimensional information of the article to be delivered is terminated (Yes in ACT S6), the three-dimensional information reading section 1004 of the POS terminal 10 registers the three-dimensional information read from the article to be delivered in the delivery information 102a (ACT S7).

The input controller 1005 of the POS terminal 10 determines whether or not the destination of the article to be delivered is input (ACT S8). If the destination of the article to be delivered is not input (No in ACT S8), the input controller 1005 of the POS terminal 10 stands by until the destination is input.

On the other hand, the destination of the delivered article is input (Yes in ACT S8), the input controller 1005 of the POS terminal 10 registers the input destination in the delivery information 102a (ACT S9).

The delivery charge calculation section 1006 of the POS terminal 10 calculates the delivery charge based on the three-dimensional information read from the article to be delivered (ACT S10).

The sales registration section 1007 of the POS terminal 10 registers the service relating to the delivery and the calculated delivery charge as the sales information (ACT S11). The display controller 1008 of the POS terminal 10 displays the calculated delivery charge (ACT S12).

The mode controller 1002 of the POS terminal 10 determines whether or not the press on the closing key 142 is detected (ACT S13). If the press on the closing key 142 is not detected (No in ACT S13), the mode controller 1002 of the POS terminal 10 maintains the three-dimensional scanner mode.

On the other hand, if the press on the closing key 142 is detected (Yes in ACT S13), the communication controller 1001 of the POS terminal 10 transmits the delivery information 102a to the server apparatus 20 (ACT S14). The server apparatus 20 stores the received delivery information 102a in the delivery information table 202a. In other words, the communication controller 1001 stores the delivery information 102a in the delivery information table 202a.

The mode controller 1002 of the POS terminal 10 sets the reading mode to the commodity code scanner mode (ACT S15).

In this way, the POS terminal 10 terminates the sales data processing relating to the delivery.

Next, the three-dimensional information display processing executed by each apparatus of the home delivery system 1 is described. There is a case in which a delivery service operator receives complaint, for example, the object article is damaged in the process of the delivery of the article. However, there may be a case in which the object article is already damaged at the time the object article to be delivered is received. In such a case, the delivery person is required to solve misunderstanding of the customer in which the object article is damaged. Thus, the home delivery system 1 solves the misunderstanding of the customer by displaying the three-dimensional image of the object article before the delivery through the three-dimensional information display processing. FIG. 9 is a flowchart illustrating the three-dimensional information display processing executed by each apparatus of the home delivery system 1 according to the embodiment.

First, the input controller 3001 of the information processing apparatus 30 determines whether or not an operation relating to the display request for displaying the three-dimensional information is received (ACT S21). If the operation relating to the display request is not received (ACT No in S21), the input controller 3001 of the information processing apparatus 30 stands by until the operation relating to the display request is received.

On the other hand, if the operation relating to the display request is received (Yes in ACT S21), the communication controller 3002 of the information processing apparatus 30 transmits the transmission request of the delivery information 102a (ACT S22).

The communication controller 2001 of the server apparatus receives the transmission request of the delivery information 102a (ACT S31). The storage controller 2002 of the server apparatus 20 extracts the delivery information 102a corresponding to the voucher number contained in the transmission request (ACT S32). The communication controller 2001 of the server apparatus 20 transmits the extracted delivery information 102a (ACT S33).

The communication controller 3002 of the information processing apparatus 30 receives the delivery information 102a (ACT S23). The display controller 3003 of the information processing apparatus 30 displays the three-dimensional information of the delivery information 102a on the display section 305 (ACT S24).

In this way, each apparatus of the home delivery system 1 terminates the three-dimensional information display processing.

As stated above, according to the POS terminal 10 of the present embodiment, on condition that the sales data processing relating to the delivery is executed, the scanner device 19 reads the three-dimensional shape of the article to be delivered and the two-dimensional image of the article. The delivery charge calculation section 1006 calculates the delivery charge of the article indicated by the three-dimensional information based on the delivery charge table master file M1 and the three-dimensional information indicating the three-dimensional shape of the object article read by the scanner device 19. The sales registration section 1007 registers the service relating to the delivery and the delivery charge calculated by the delivery charge calculation section 1006 or the commodity contained in the two-dimensional image and the sales amount of the commodity based on the two-dimensional image as the sales information. The display controller 1008 displays the delivery charge or the sales amount of the commodity registered as the sales information by the sales registration section 1007. Thus, the store clerk can know the delivery charge without measuring the volume of the article to be delivered, using the tape measure. The POS terminal 10 according to the present embodiment can easily carry out the sales data processing at the time of the reception job of the delivery.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

In the foregoing embodiment, the sales registration section 1007 registers the commodity identified by the commodity code extracted from the code symbol contained in the two-dimensional image captured by the scanner device 19 as the sales information in the commodity code scanner mode. However, the present invention is not limited to that. The sales registration section 1007 may register the commodity identified with a laser method for optically reading the reflected light of the laser light emitted to the commodity code by the scanner device 19 as the sales information. Alternatively, the sales registration section 1007 may register the commodity identified with an object recognition method that recognizes an article based on feature amount of the article such as color of the article and unevenness of the article as the sales information.

The programs executed by each apparatus of the foregoing embodiment and the modification may be incorporated into a storage medium (ROM or storage section) of each apparatus to be provided; however, the present invention is not limited to this. The programs may be recorded in a computer-readable storage medium such as a CD-ROM, a FD (Flexible Disk), a CD-R, a DVD (Digital Versatile Disk) and the like in the form of installable or executable file to be provided. Further, the storage medium is not limited to a medium independent from a computer or an embedded system, but also contains a storage medium that stores or temporarily stores the programs by downloading the programs transmitted through a LAN or an Internet.

Further, the programs executed by each device of the foregoing embodiment and the modification is stored in a computer connected with a network and downloaded via the network to be supplied or may be supplied or distributed via the network such as the Internet.

What is claimed is:

1. A sales data processing apparatus, comprising:
   a processor that executes instructions to perform operations, comprising:
   switching a mode between a first mode for enabling a reading device, which reads a three-dimensional shape of an article and a two-dimensional image of the article, to read the three-dimensional shape of the article and a second mode for enabling the reading device to read the two-dimensional image of the article;
   determining a delivery charge of the article based on the three-dimensional shape of the article read while in the first mode and a list in which the delivery charge is determined for each volume of an article to be delivered, wherein the three-dimensional shape is determined based on irradiating the article with laser light and determining a time spent on a reciprocation of a reflection of the laser light from the article and a direction of the reciprocation of the reflection of the laser light from the article;

registering an amount of the article contained in the two-dimensional image based on the two-dimensional image read while in the second mode; and displaying, on a display device, the delivery charge or the amount registered.

2. The sales data processing apparatus according to claim 1, wherein the operations further comprise:

storing the three-dimensional shape of the article in association with identification information relating to the delivery.

3. The sales data processing apparatus according to claim 1, wherein the operations further comprise:

switching the mode to the second mode in response to receiving an operation to terminate a processing relating to the first mode.

4. The sales data processing apparatus according to claim 2, wherein the operations further comprise:

switching the mode to the second mode in response to receiving an operations to terminate a processing relating to the first mode.

5. The sales data processing apparatus according to claim 1, wherein the display device is a first display device and the operations further comprise:

displaying, on a second display device, a use method for using the reading device.

6. A method for executing a data processing of an article, including:

switching, by a device comprising a processor, a mode between a first mode for enabling a reading device, which reads a three-dimensional shape of an article and a two-dimensional image of the article, to read the three-dimensional shape of the article and a second mode for enabling the reading device to read the two-dimensional image of the article;

determining, by the device, a charge of the article based on the three-dimensional shape of the article while in the first mode and a list in which the charge is determined for each volume of an article to be delivered, wherein the three-dimensional shape is determined based on irradiating the article with laser light and determining a time spent on a reciprocation of a reflection of the laser light from the article and a direction of the reciprocation of the reflection of the laser light from the article;

registering, by the device, an amount of the article contained in the two-dimensional image based on the two-dimensional image while in the second mode; and displaying, by the device, the calculated charge or the registered amount.

* * * * *